United States Patent
Nakazawa et al.

(10) Patent No.: US 6,331,903 B1
(45) Date of Patent: *Dec. 18, 2001

(54) ORDER APPARATUS FOR PRINT INCLUDING RECORDING ORDER INFORMATION ON DEVELOPED FILM, A CARD READER FOR READING THE ORDER INFORMATION, OR CONFIRMING THE ORDER INFORMATION

(75) Inventors: Makoto Nakazawa; Masaaki Orimoto; Toru Nishimura; Atsushi Itoh, all of Asaka (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/929,798

(22) Filed: Sep. 15, 1997

Related U.S. Application Data (63) Continuation of application No. 08/369,930, filed on Jan. 6, 1995, now abandoned.

(30) Foreign Application Priority Data

Jan. 10, 1994 (JP) .................................................. 6-000923
Mar. 22, 1994 (JP) .................................................. 6-050529
Aug. 29, 1994 (JP) .................................................. 6-203644

(51) Int. Cl.$^7$ .............................. H04N 1/04; G03F 3/10; G03B 27/32; G03B 27/52

(52) U.S. Cl. .......................... 358/487; 358/527; 355/27; 355/40; 396/311; 396/313; 396/319

(58) Field of Search ........................ 358/444, 450, 358/452, 453, 474, 487, 478, 506, 527; 355/27, 29, 40, 123; 396/284, 311, 313, 314, 317, 319, 321, 331, 335

(56) References Cited

U.S. PATENT DOCUMENTS

| | | | |
|---|---|---|---|
| 4,039,258 | * | 8/1977 | Hujer et al. ............................ 355/27 |
| 4,274,732 | * | 6/1981 | Thurm et al. ........................... 355/38 |
| 4,607,949 | * | 8/1986 | Hakamada et al. ..................... 355/40 |

(List continued on next page.)

FOREIGN PATENT DOCUMENTS

| 4 306654 | 4/1991 | (JP) . |
|---|---|---|
| 545854 | 8/1991 | (JP) . |

Primary Examiner—Kimberly A. Williams (57) ABSTRACT

An order apparatus for print which does not require an index print, allows required printing order of frames to be designated and allows watching a replayed picture of the film. When a developed still film is set, plural frame pictures of the film are read out and stored in a picture memory to output picture signal showing plural frame pictures to a picture display apparatus to thereby display plural frame pictures. Accordingly, when designating the frames to be printed on the display apparatus by means of a touch pen and also designating the number of prints of the designated frame, the order information regarding print will be recorded in a record medium. The order information may be recorded on a modifiable recording medium on the developed film. The order apparatus for printing may include a card reader for reading order information including the number of prints per frame number written on an order card by a user. The order information may be recorded in the recording medium in accordance with confirmation of such information from a user.

20 Claims, 9 Drawing Sheets

U.S. PATENT DOCUMENTS

| | | | |
|---|---|---|---|
| 4,672,462 | * | 6/1987 | Yamada ................................ 358/450 |
| 4,751,583 | * | 6/1988 | Levine ................................ 358/452 |
| 4,760,608 | * | 7/1988 | Suzuki ................................ 358/452 |
| 4,862,200 | * | 8/1989 | Hicks ................................ 354/75 |
| 4,935,809 | * | 6/1990 | Hayashi et al. ...................... 358/527 |
| 4,971,362 | * | 11/1990 | Lapsker ................................ 283/58 |
| 4,975,732 | * | 12/1990 | Robinson et al. .................... 355/40 |
| 4,991,004 | * | 2/1991 | Hayashi ................................ 358/450 |
| 5,021,820 | * | 6/1991 | Robinson et al. .................... 355/40 |
| 5,043,758 | * | 8/1991 | Nealon ................................ 355/40 |
| 5,124,742 | * | 6/1992 | Yoshikawa ........................... 355/27 |
| 5,258,859 | * | 11/1993 | Wada et al. .......................... 358/487 |
| 5,270,755 | * | 12/1993 | Ohno et al. .......................... 354/106 |
| 5,307,100 | * | 4/1994 | Kubo ................................ 354/105 |
| 5,344,730 | * | 9/1994 | Kitamoto .............................. 430/14 |
| 5,412,449 | * | 5/1995 | Lam ................................ 355/22 |
| 5,412,773 | * | 5/1995 | Carlucci et al. ..................... 395/156 |
| 5,420,699 | * | 5/1995 | Yamanouchi et al. .............. 358/487 |
| 5,448,377 | * | 9/1995 | Kinoshita ............................ 358/452 |
| 5,455,648 | * | 10/1995 | Kazami ................................ 354/106 |
| 5,461,440 | * | 10/1995 | Toyoda et al. ....................... 354/106 |
| 5,699,109 | * | 12/1997 | Nishimura ............................ 348/96 |
| 5,703,701 | * | 12/1997 | Yamamoto et al. ................. 358/487 |
| 5,808,667 | * | 9/1998 | Sugiyama ............................ 348/96 |

* cited by examiner

FIG. 4(C)
MONITOR

ORDER APPARATUS FOR PRINT INCLUDING RECORDING ORDER INFORMATION ON DEVELOPED FILM, A CARD READER FOR READING THE ORDER INFORMATION, OR CONFIRMING THE ORDER INFORMATION

This application is a continuation of application Ser. No. 08/369,930 filed on Jan. 6, 1995, now abandoned.

BACKGROUND OF THE INVENTION

1. Field of the Invention

The present invention refers to an order apparatus for print, and particularly to an order apparatus for print which is used in a so-called DPE shop and allows to accept printing order at the counter.

2. Description of the Related Art

A negative film which has been already developed is generally cut into six pieces, one piece which includes six frames, and is returned to a client in a transparent nega-sheath. When ordering printing from a shop, it is necessary to confirm the negative film to be printed and to directly write the number of prints in an entry box printed on the nega-sheath which corresponds to the negative film.

It has been proposed to return a developed negative film in a film cartridge. But, the negative film can not be confirmed with naked eyes, so it is also proposed that an index print on which a certain serial frame number and an index which corresponds to a frame number are preliminary printed when additionally returned with the film cartridge.

As taught in Japanese Patent Application No. 3-71413, such index print and a mark sheet wherein a blank for client's name and a printing order box which corresponds to the frame number are printed are prepared for ordering printing, so that the client marks by himself to designate the frame number in the printing order box in conformity with the index print.

In accordance with Japanese Patent Application Laid-open No. 5-45854, the mark sheet is omitted but an index print is preliminary prepared, the index print printed thereon with bar codes showing its frame number and order boxes near the index picture, so that a client checks the box corresponding to the index picture to be printed by seeing the index print and thereafter in a DPE shop, the bar code of checked index picture is read by means of a bar-code reader to accept print order.

However, in accordance with the above-mentioned mark sheet, the information on the mark sheet can be read out optically without any fault as input data, but the client may possibly make a mistake in the marking place when ordering. When using the index print for ordering, the index print on which all frames are preliminary printed should be prepared, which is costly for ordering. The confirmation procedure of whether the film corresponds to the index print is troublesome. Even if by codes, it is not reliable without confirmation with the naked eyes. If the index print is lost, the necessary printing can not be ordered any more.

SUMMARY OF THE INVENTION

The present invention is conceived based on the above circumstances and has an object of providing an order apparatus for watching the print replay picture of the film without the index print to designate the frame to be printed, which should be a simple procedure when ordering printing, and which confirms and amends the order detail.

In order to achieve these and other objects, the present order apparatus for print includes a picture display ; a film picture reproducing unit for displaying plural frame pictures on the picture display after reading out pictures of the film; frame designation unit for designating a frame to be printed on the picture displayed by the picture display order information input for inputting order information for print including the number of prints designated by the frame designation unit; and a recorder for recording in a record medium the order information for frame to be printed in accordance with the frame designation unit and/or the order information input.

The present order apparatus for print can further include: a card reader section which optically reads order information for print including the number of prints written by hand or in a mark-sheet type on an order card showing at least printing number in accordance with the frame number when the order card is inserted into the apparatus; a memory for storing therein order information read by the card reader section; a picture display, a film picture reproducing unit for displaying single or plural frame pictures after reading picture of developed film corresponding to contents of the order card and for displaying order information stored in the memory corresponding to the respective frames; a frame designation unit for designating a frame to be amended or added by watching a displayed picture on the picture display means; order information input for inputting order information of the frame designated by the frame designation unit and for rewriting the order information stored in the memory based on the input order information; and a recorder for recording the order information stored in the memory in a record medium.

According to this invention, the frame picture can be displayed on the picture display instead of the index print. Particularly, when setting a developed film in the film picture reproducing unit, the film picture reproducing unit displays plural frame pictures on the picture display after reading the film pictures. The necessary frame to be printed can be designated by the frame designation unit by watching the display to thereby input order information including the number of prints of the designated frame by the order information input. The thus input order information for printing can be recorded in a record medium.

In another embodiment of the present invention, the order information can be read optically from an order card by a card reader section and thereafter stored in a memory. The picture display also displays the frame picture as well as order information stored in the memory. Accordingly, the order information can be amended and added preferably by operating the frame designation unit and the order information input while watching the picture display to replace the preliminary recorded order information in the memory with new one. The order information stored in the memory is stored in the record medium.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE PREFERRED EMBODIMENT(S)

Detailed description will hereunder be given of the preferred embodiment of the order apparatus for print according to the present invention with reference to the accompanying drawings.

Figure 1:
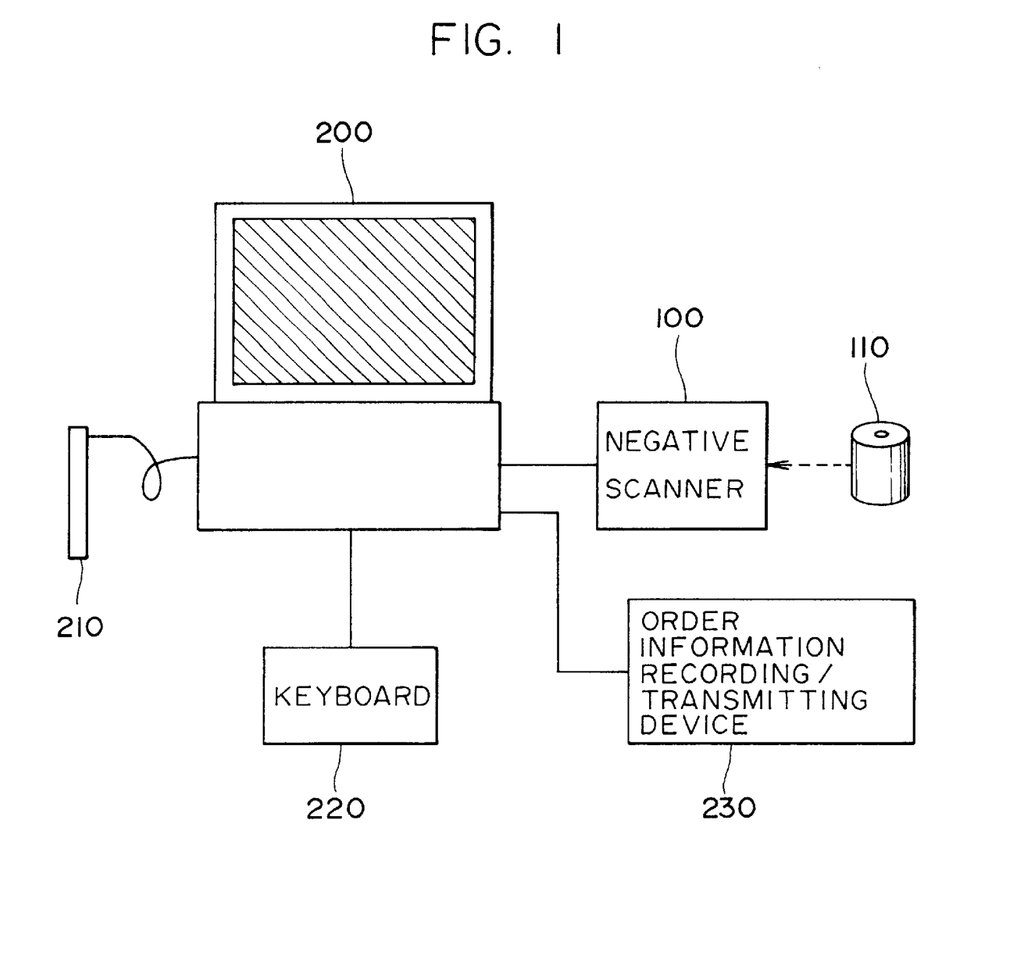
FIG. 1 is an external view showing the first embodiment of the present order apparatus for print according to the present invention.

FIG. 1 is an external view of the appearance of the overall composition of a first embodiment in accordance with the present order apparatus for print. The order apparatus of print essentially consists of a negative scanner 100, a picture display apparatus 200, a touch pen 210, keyboard 220, and an ordering information recording/transmitting device 230.

The details of the negative scanner 100 will be explained hereunder.

Figure 2:
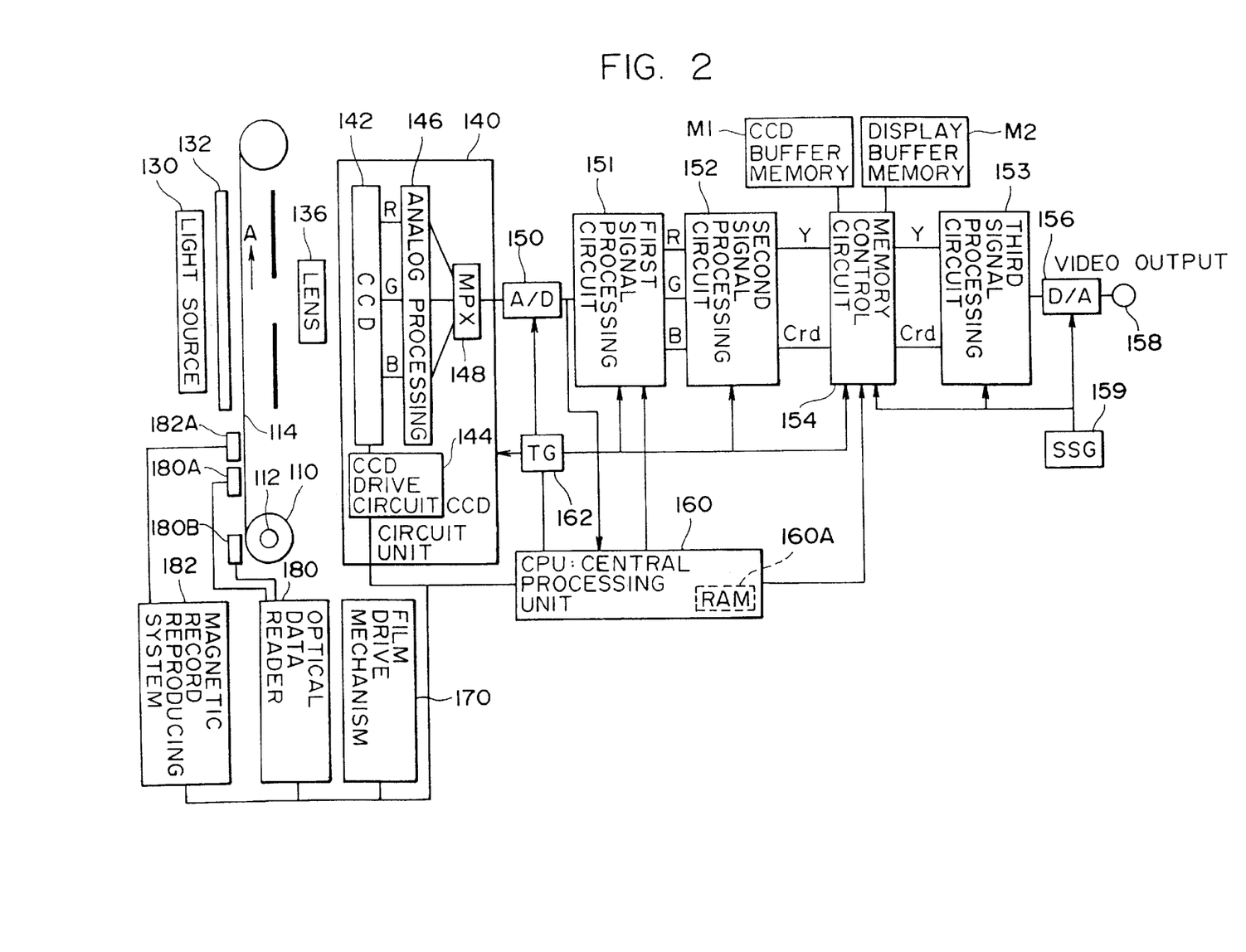
FIG. 2 is a block diagram showing the first embodiment of an internal structure of negative scanner of FIG. 1.

A block diagram of an embodiment of the negative scanner 100 is shown in FIG. 2, which has a light source for lighting 130, camera lens 136, a CCD circuit unit 140 including a CCD line sensor 142, a first signal processing circuit 151, a second signal processing circuit 152, a third signal processing circuit 153, a memory control circuit 154, a CCD buffer memory M1, a display buffer memory M2, a central processing unit (CPU) 160, a film drive mechanism 170, an optical data reader 180, a magnetic record reproducing system 182, and a container (not-shown) receiving therein a film cartridge 110.

Figure 3:
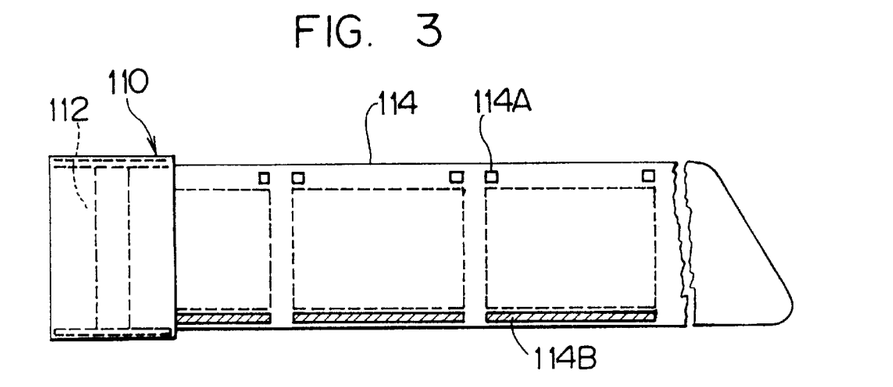
FIG. 3 is a diagram showing an example of film cartridge applicable to the order apparatus shown in FIG. 1.

The film cartridge 110 has, as shown in FIG. 3, a single spool 112 around which a long photographic film 114 is wound. The photographic film 114 is provided with plural perforations 114A which shows the positions of each frame, a magnetic record layer 114B at a longitudinal edge portion of the film 114 or on the film 114 entirely, the magnetic record layer 114B recording magnetic shot data every frame when a camera functions to write such data by a magnetic head. The developed film 114 can be collected or wound around the film cartridge 110 for safekeeping.

As can be seen from FIG. 2, the light source 130 is composed of a long fluorescent lamp disposed perpendicularly to a feeding direction of the film 114, of which light reaches to the surface of the film 114 through an infrared rays cutoff filter 132. A photo-image light which passed through the film 114 is focused into an image on a photo-receiving surface of the CCD line sensor 142 by means of the camera lens 136 providing a single focal point. Incidentally, the CCD line sensor 142 is understood as to be arranged perpendicularly to the feeding direction of the film 114. The focused photo-image light on the photo-receiving surface of the CCD line sensor 142 is provided to be electrically charged for certain intervals in respective sensors having R, G, B filter and it will be changed into R, G, B signal electric charge corresponding to light strength. The stored signal electric charge will be read out at a shift register by means of read-gate pulses having certain cycle sent from a CCD drive circuit 144 and further read out corresponding to register transmitting pulses. While the CCD line sensor 142 activating to the photo-image, the film 114 continuously and constantly moves in a film feeding direction denoted by an arrow A by the film drive mechanism 170.

The signal electric charge successively read out from the CCD line sensor 142 is clamped by a CDS clamp to be added as the R, G, B signal to an analog processing circuit 146 to control gain and so on of the R, G, B signal. The R, G, B signal issued from the analog processing circuit 146 is dot-sequentially processed by the multiplexer 148, converted into digital signal in the A/D converter 150 and added into the first signal processing circuit 151 and the CPU 160.

The first signal processing circuit 151 includes a white-balance control circuit, negapositive convert circuit, γ-corrective circuit and a RGB coincidence circuit to process the dot-sequential R, G, B signal successively to thereby send coincided R, G, B signal to the second signal processing circuit 152.

The second signal processing circuit 152 has a matrix circuit to generate a brightness signal Y and a chroma signal Cr/b based on the thus-inputted R, G, B signal to thereby send these signals to the memory control circuit 154.

The memory control circuit 154 is provided to control to read/write the above-mentioned brightness signal Y and chroma signal Cr/b in the CCD buffer memory M1 and to control the read/write brightness signal Y and chroma signal Cr/b stored in the CCD buffer memory M1 into the display buffer memory M2. The details regarding to the read/write controls into the CCD buffer memory M1 or display buffer memory M2 will be explained in a later paragraph.

The brightness signal Y and chroma signal Cr/b read out from the display buffer memory M2 by means of the memory control circuit 154 are applied to the third signal processing circuit 153. The third signal processing circuit 153 is provided to generate, for example, a NTSC-type composite color picture signal based on the inputted brightness signal Y and chroma signal Cr/b and output to the picture display apparatus 200 (see, FIG. 1) through a D/A converter 156 and a video output terminal 158. Incidentally, the memory control circuit 154, third signal processing circuit 153 and the D/A converter 156 receive therein certain synchronous signals respectively from a synchronizing signal generating circuit 159 to synchronize respective circuits to one another to thereby obtain a picture signal including required synchronous signal. Incidentally, the CCD circuit unit 140, A/D converter 150, first signal processing circuit 151, second signal processing circuit 152 and the memory control circuit 154 receive timing signals from a timing signal generating circuit 162 controlled by the CPU 160 to be synchronized to one another.

The above-mentioned film drive mechanism 170 relates to the spool 112 of the film cartridge 110 and consists of a film feeding section forwarding/revising the spool 112, a film winding section winding up the film 114 out from the film feeding section, and a film speed control section arranged intermediately between the two sections to control film feeding speed by a combination of a capstan and a pinch roller. Incidentally, the film feeding section functions to drive the spool 112 of the film cartridge 110 clockwisely on FIG. 2 to feed out the film 114 of the film cartridge 110 until a forward end of the film reaches at and is wound up by the film winding section.

The optical data reader 180 includes a first photosensor 180A optically detecting a perforation 114A of the film 114 and a second photosensor 180B optically detecting optical data such as bar code printed on a peripheral portion of the film. The optical data detected by the optical sensors 180A and 180B is processed and sent to the CPU 160.

The magnetic record reproducing system 182 has a magnetic head 182A by which the magnetic data recorded at the magnetic record layer 114B of the film 114 can be read. While the magnetic data will be processed and sent to the CPU 160, some data for writing from the CPU 160 is transmitted to the magnetic head 182A after being converted into preferable signal to be written on the magnetic record layer 114B of the film 114.

When the film cartridge 110 is set in the negative scanner 100, the CPU 160 first carries out a so-called film loading by controlling the film drive mechanism 170, that is, the forward end of the film 114 is fed out from the film cartridge 110 to be wound by a wind shaft provided in the film winding section. When the film loadings completed, the film 114 will be fed in the arrow A direction at high speed. The picture data can be obtained when the CCD line sensor 142 scanning as the optical and magnetic data are read out by the optical data reader 180 and the magnetic record reproducing system 182.

The process based on the picture data obtained in the above-mentioned scanning will be explained hereunder.

Figure 4A:
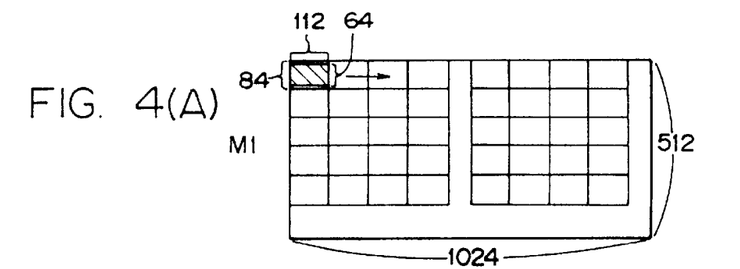
FIG. 4(A) and FIG. 4(B) are diagrams showing memory area for CCD buffer memory and display buffer memory in negative scanner shown in FIG. 2.

The picture data for every frame obtained in scanning, that is, the brightness signal Y and the chroma signal Cr/b are successively stored in the CCD buffer memory M1 through the memory control circuit 154. As is shown in FIG. 4(A), the one frame should be understood as to have 112 picture elements along the film feeding direction and 64 picture elements along a traverse direction with respect to the film feeding direction. The CCD buffer memory M1 has a memory capacity to store therein data by 512×1024 picture elements as shown in FIG. 4(A) to thereby store picture data by 40 (5×4×2) frames in total. The CCD buffer memory M1 can store therein picture data of index picture by 40 frames.

The display buffer memory M2 essentially has a memory capacity for data by 512×1024 picture elements, but when storing such picture data of the index picture, picture elements for one frame will be expanded by 73×128 to store picture data by 20 (5×4) frames. When the index picture displayed on a monitor TV, a 480×640 picture element area at the upper portion on the left side of the display buffer memory M2 will be read out (see, FIG. 4(B) and 4(C)).

The CCD buffer memory M1 stores picture data of each frame from the uppermost left one to the right side one gradually until four frames have been stored. This process will be repeated five times. When memory process is repeated five times, the next 20-frame will be stored in the same way.

Figure 4B:
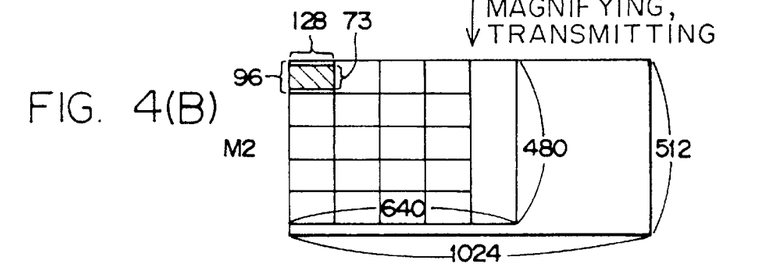
Figure 4C:
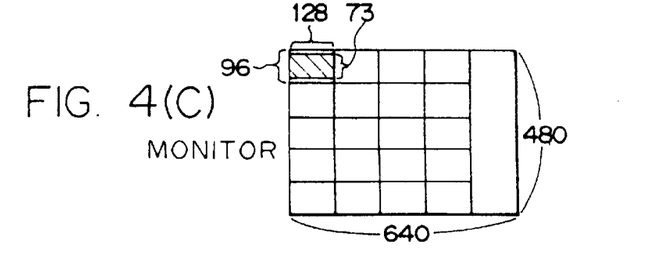
FIG. 4(C) is a diagram showing memory area read out from display buffer memory in negative scanner shown in FIG. 2.

As has been explained above, the display buffer memory M2 has a limited memory capacity to store therein picture data by twenty frames at one time, so that when displaying next index picture after the twenty-first frame, it will be required to rewrite the picture data therein by scrolling up the index picture. For example, the picture data of one-line memory area corresponding to frames No. 1–4 of the display buffer memory M2 is cleared and the picture data of one-line memory corresponding to frames No. 21–24 will be displaced, and a scanning start address at a picture signal output will be counted up to the second line, whereby the monitor TV can display a new index picture which scrolls up by one line.

Figure 5:
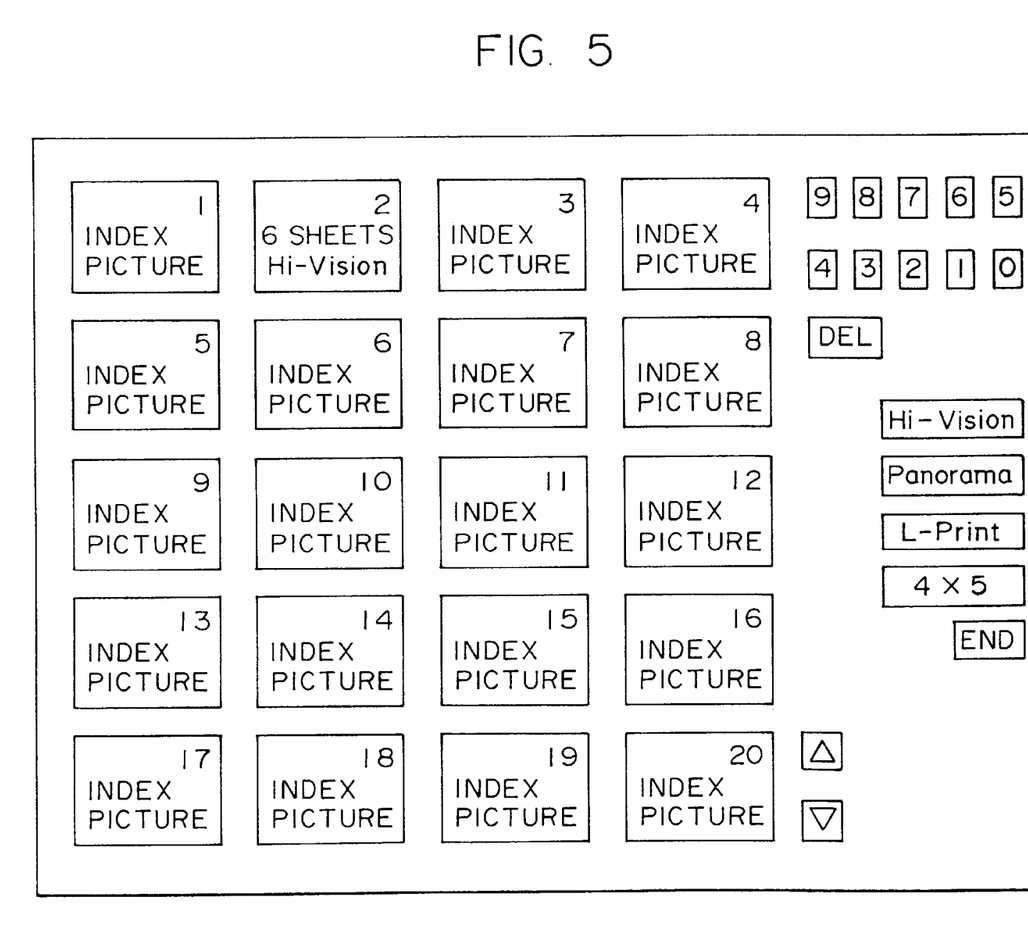
FIG. 5 is a diagram showing one example of display presented by a picture display apparatus shown in FIG. 1.

In an external area of the memory area for the index picture of the display buffer memory M2, as shown in FIG. 5, there are stored data such as figures (9–0) to designate the number of prints, a word (DEL) ordering elimination, words (Hi-Vision, Panorama, L-Print, 4×5) selecting print type, a word meaning end, and a symbol meaning scrolling up/down, whereby the picture display apparatus 200 displaying picture signal generated based on data read out from the display buffer memory M2 will display the picture shown in FIG. 5. Incidentally, the CPU 160 may display the index picture superimposed with the frame number by numbering respective frames with the numerals 1, 2, . . . corresponding to the read out picture data of the respective frames in scanning and by outputting character signals meaning frame number.

Figure 6:
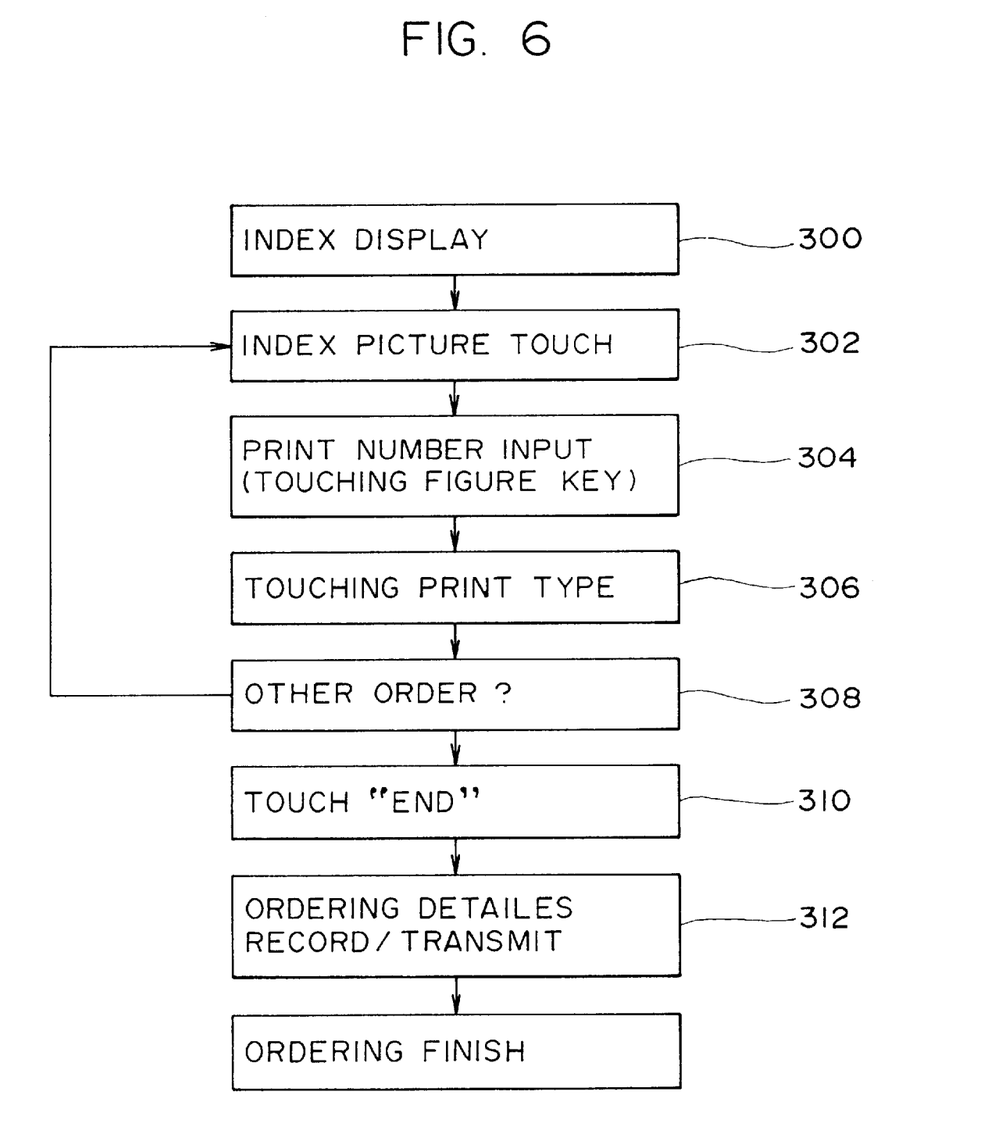
FIG. 6 is a flow-chart showing operational process when ordering printing by using the present order apparatus for print accordance to this invention.

Now, when ordering prints by utilizing the above-explained picture display apparatus 200, the process will be explained with reference to a flow chart in FIG. 6.

First of, as has been mentioned above, the film cartridge 110 is set in the negative scanner 100 to display on the picture display apparatus 200 the index picture shown in FIG. 5 (step 300). Watching the displayed index picture, an index picture of a frame to be printed will be selected on the display by using the touch pen 210 (step 302). The selected index picture by means of the touch pen 210 may be set in a frame or the corresponding frame number will be marked with brink to be distinguished from other ones on the display.

The number of prints to be printed can be ordered by touching the corresponding figure on the display by means of the touch pen 210 (step 302). The type of printing for frame to be printed can be also selected by means of the touch pen 210 on the display (step 304). In FIG. 5, one example is shown such that No. 2 frame is selected, expected to be printed by six times, and treated as Hi-vision and the superimpose of frame No. as well as details of ordering state are shown in the same index picture.

It will be confirmed whether a further ordering is resumed or not (step 308), and if the further ordering is needed, the processes from step 302 to step 306 will be repeated. Incidentally, the symbols Δ and ∇ on the display scroll up and down the present index picture when they are touched with the touch pen 210.

If ordering needs to be stopped, it will be operated when the touch pen 210 touches the end symbol on the display (step 310). The details of ordering are therefore confirmed and are recorded in a record medium provided in the present apparatus by means of the ordering information recording/transmitting device 230, otherwise it will be transmitted to an external device so as to be recorded in an external record medium (step 312). In these steps, it will be also recommended to record identification information of the ordered film cartridge 110 and personal information of a person who ordered printing through the keyboard 220. The details of ordering may be written in the magnetic record layer 114B corresponding to the required frame of the film 114 in the film cartridge 110. If the apparatus is provided with a printer (not-shown), the details of ordering can be output as a receipt for the person who ordered printing.

A photo finisher will then start required reprinting by reading the ordering information from the record medium wherein the film cartridge 110 and the printing details are recorded or from the film cartridge 110 wherein the printing details are magnetically recorded.

By the way, in the above embodiment, a frame to be printed is selected by the touch pen on the index picture of the picture display apparatus, however other devices may be employed instead of the touch pen for example, a touch sensor system provided on the display of the picture display apparatus in a corresponding state to the index picture, a mouse system in which a cursor is shown on the display of the picture display apparatus so that it moves in response to movement of mouse, or a track-ball system. It is possible to use the keyboard when several frames are ordered to be printed.

Figure 7:
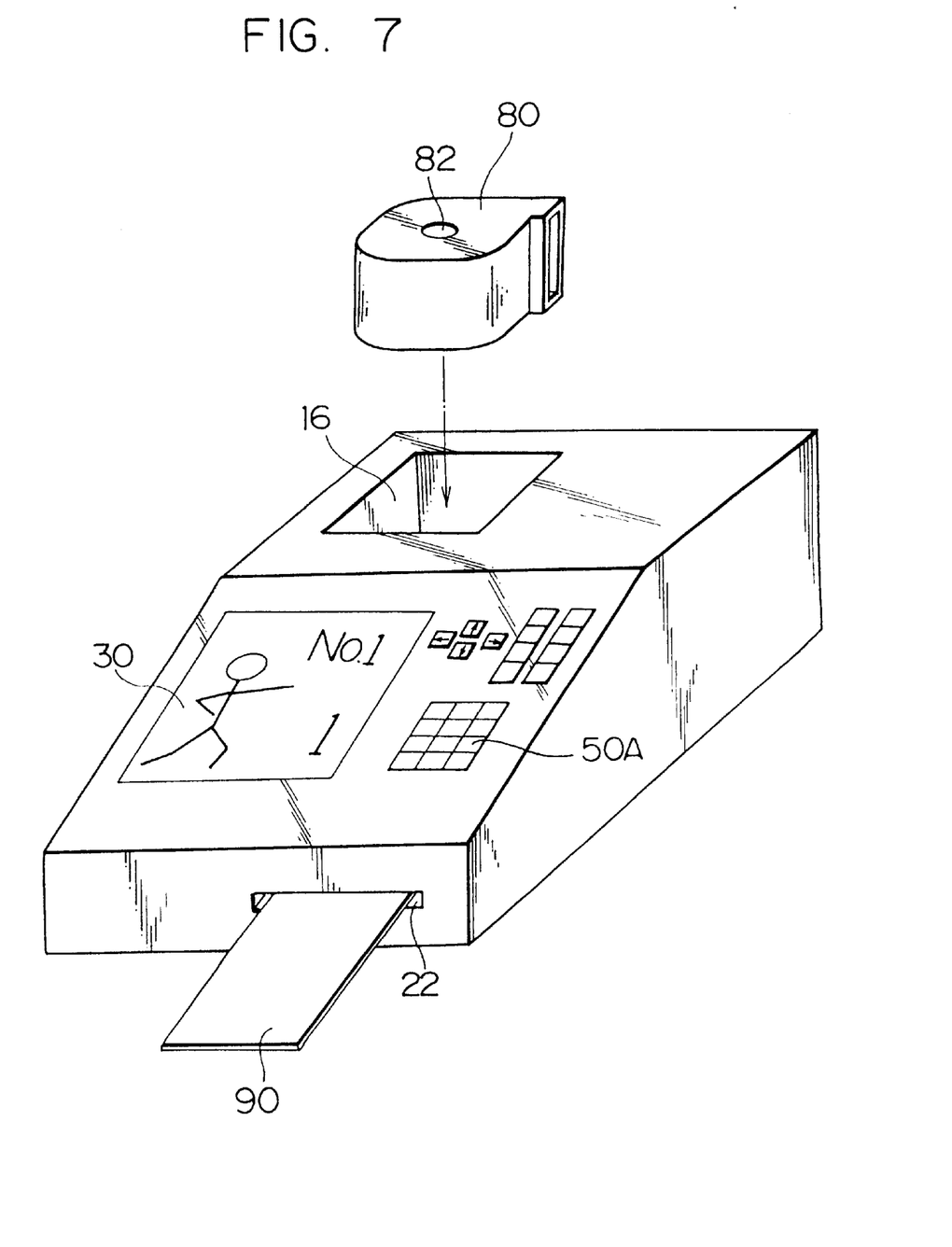
FIG. 7 is an external view showing the second embodiment of the present order apparatus for print according to the present invention.
Figure 8:
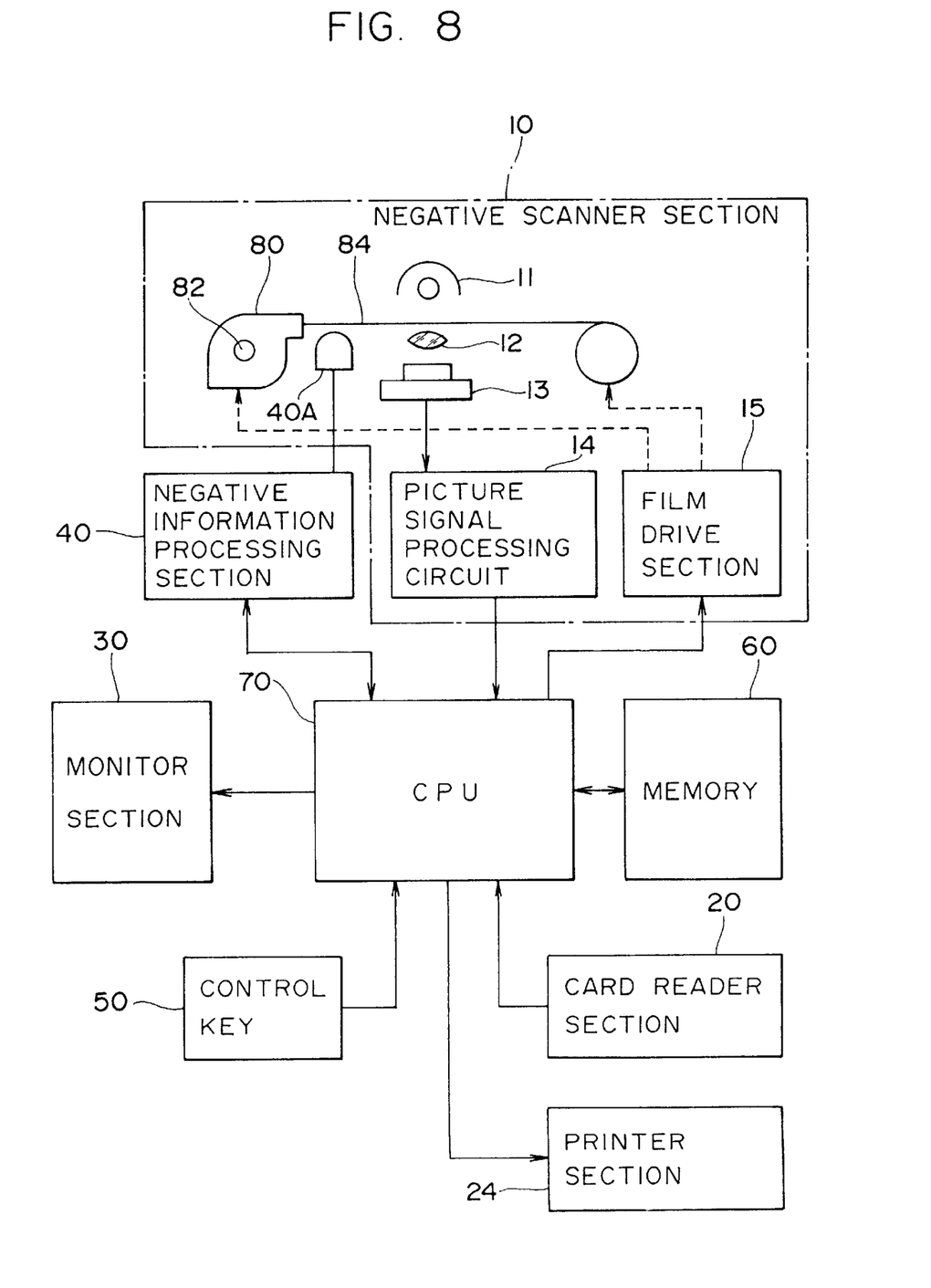
FIG. 8 is a block diagram showing an internal structure of the order apparatus for print of FIG. 7.

Now turning to the second embodiment of the present order apparatus for print, of which entire appearance is shown in FIG. 7 and of which system is schematically shown in a block diagram of FIG. 8.

As can be seen from FIG. 8, the shown order apparatus for print comprises a negative scanner section 10, card-reader section 20, printer section 24, monitor section 30, magnetic information processing section 40 including magnetic head 40A, control key 50, memory 60 and a central processing unit (CPU) 70.

The negative scanner section 10 will hereunder be explained in detail.

As shown in FIG. 8, the negative scanner section 10 consists of light source for illuminating 11, camera lens 12, CCD 13, picture signal processing circuit 14, film drive section 15 and a cartridge receiving section 16 (see, FIG. 1) to keep inside thereof the film cartridge 80.

The film cartridge 80 has a single spool 82 just as the film cartridge 110 already shown in FIG. 3, the spool 82 being capable of advancing a frame of the film. The film has thereon sectionally or entirely a magnetic record layer wherein a portion corresponding to each frame records the number of prints and ordering information such as trimming by means of the magnetic head 40A.

A photo-image light of the film 84 illuminated by the light source 11 is focused into an image on a photo-receiving surface of the CCD 13 by means of the camera lens 12. The focused photo-image light on the photo-receiving surface of the CCD 13 is provided to be electrically charged in respective sensors and it will be changed into signal electric charge corresponding to light strength. The stored signal electric charge will be read out at a shift register by means of read-gate pulses having certain cycle sent from a CCD drive circuit (not-shown) and further read out as picture signal corresponding to register transmitting pulses.

The picture signal successively read out from the CCD 13 is processed under a certain condition by a picture signal processing circuit 14 and transmitted to a monitor section 30 through a central processing unit (CPU) 70 so as to be displayed on the monitor section 30 as the film picture for one frame.

The film drive section 15 relates to the spool 82 of the film cartridge 80 and consists of a film feeding section forwarding/rewarding the spool 82 and a film winding section winding up the film 84 out from the film feeding section so as to advance the film a frame upon receiving a frame feed command. The film feeding section is driven such that when the film cartridge 80 is set the spool 82 of the film cartridge 80 rotates clockwisely on FIG. 8 to feed out the forward end of the film from the film cartridge 80.

Figure 9:
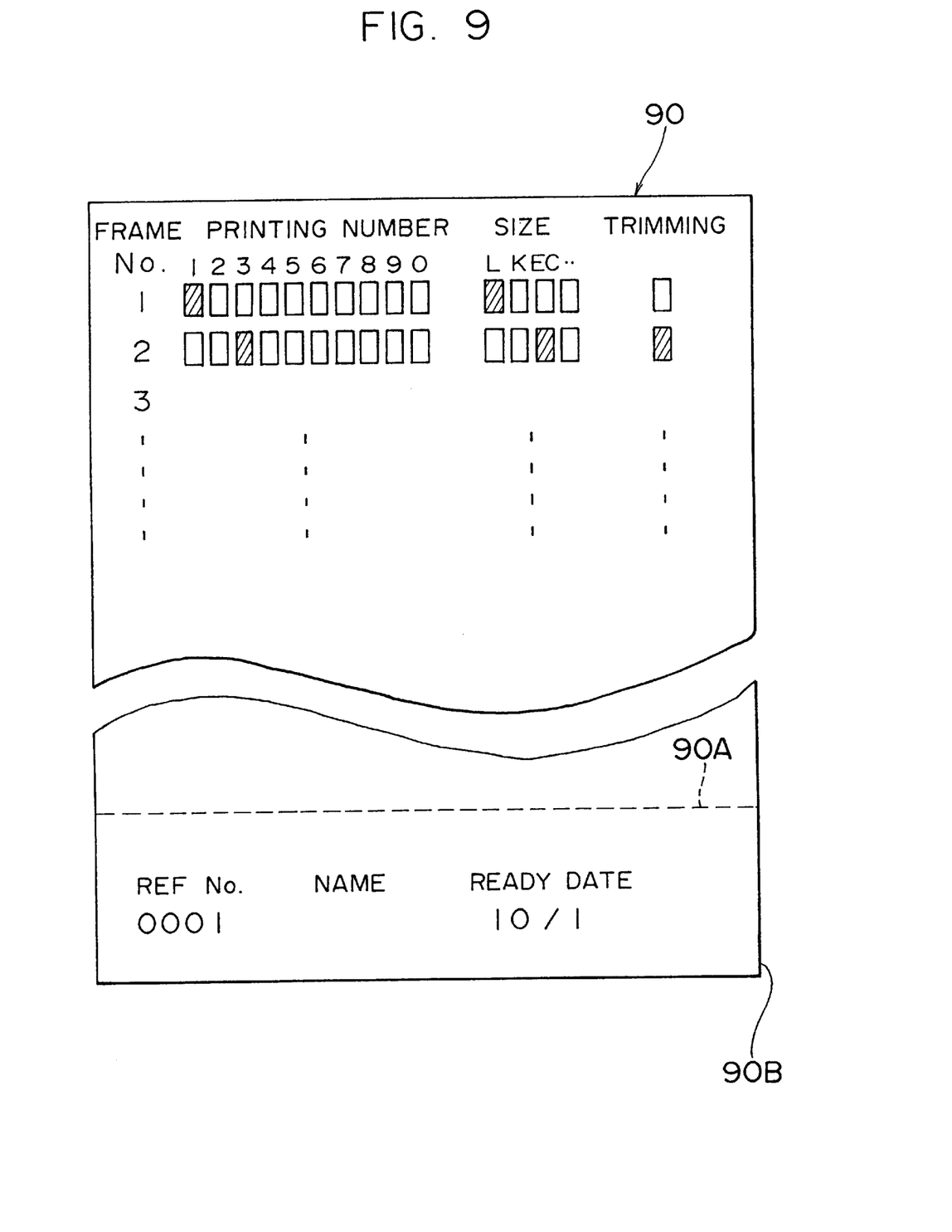
FIG. 9 is a plane view showing one example of order card applicable to the order apparatus for print of FIG. 7.

As can be seen from FIG. 7, the card-reader section 20 is provided to receive therein an order card 90 from its slot 22. An example of the order card 90 is shown in FIG. 9 wherein print number per frame, print size, trimming necessity are designated respectively by checking the marks, so that when ordering reprinting, the necessary the number of prints is marked on the above-mentioned order card 90 confirming a simultaneous print or index print. Incidentally, the order card 90 has a stub 90B which can be departed from a perforated line 90A and kept by a client.

After inserting the order card 90 in the card-reader section 20, the ordering information such as printing number on the order card 90 is read out therein to be sent to the CPU 70 and to be stored in the memory 60. The capacity of memory 60 is enough to store all picture data for frames of the film 84.

The processing steps in the CPU 70 will be explained in the second embodiment.

When the film cartridge 80 is set at the cartridge receiving section 16 of the negative scanner section 10, the CPU will start a film loading operation by means of the film drive section 15. Particularly, the film 84 is fed out from the film cartridge 80 that the forward end of the film will be wound around a winding shaft of the film winding section. When the film loading is completed, after pressing a frame advance key (not-shown) of the control key 50, the film drive section 15 advances the film a frame. In this operation, the CPU continuously counts the number of frames to confirm the actual frame number located at the processed position.

The thus-located film picture is displayed by the monitor section 30 based on the picture signal sent from the picture signal processing circuit 14 and the CPU 70 superimposes the first character meaning the frame number as well as the second character regarding to the ordering information on the located film picture after reading out the ordering information corresponding to the frame number from the memory 60.

Accordingly, the client confirms the ordering information for the displayed film picture by watching the display of the monitor section 30.

The operation of the control key 50 can effect amendments of the ordering information for the displayed film picture. Therefore, when changing the number of prints, the required number is input by means of a ten-key 50A (shown in FIG. 7) to amend the prior number of prints of the film picture stored in the memory and also revise the number of prints displayed on the monitor section 30. If the shown film picture is designated with "Trimming", a trimming frame is superimposed on the film picture and the trimming information including position and size of the trimming frame can be input by a trimming control key (not-shown).

All of the necessary confirmations and amendments for every frame by advancing the film a frame are carried out as mentioned above, the order information stored in the memory 60 is written on the magnetic record strip of the film 84. In fact, the CPU 70 reads out the order information stored in the memory 60 to send them to the magnetic information processing section 40 and feeds the film 84 controlling the film drive section 15. The magnetic information processing section 40 converts the order information sent from the CPU 70 into a signal capable of being magnetically recorded and thereafter outputs it to the magnetic head 40A to record on the magnetic record strip corresponding to the frame of the film 84.

When the ordering is completed, the CPU 70 outputs the order information to the printer 24 by which the order details including the stub is printed out.

As mentioned above, any confirmation and amendment of order information is carried out per frame by advancing the film a frame in this embodiment, however it should not be limited into the above but can be done the same by displaying on the monitor section 30 the index picture consisting of plural frames along with the order information.

In this case, when the film cartridge 80 is set, all frames of the film are scanned to store the corresponding picture data in the memory 60 and the index picture is shown on the monitor section 30 based on the picture data for all frames.

Figure 10:
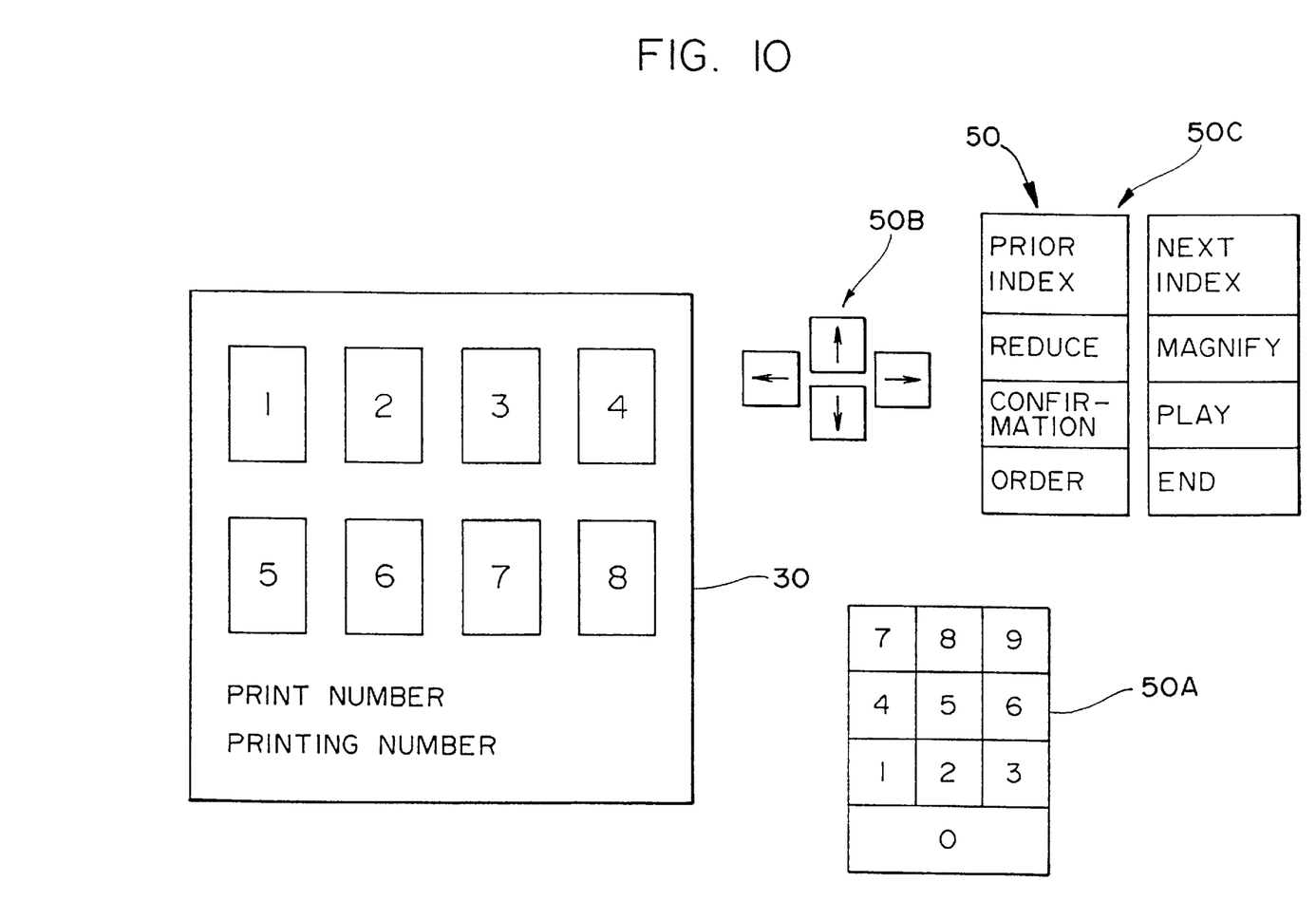
FIG. 10 is a diagram showing one example of monitor section and operation key shown in FIG. 7.

FIG. 10 shows an example of the monitor section 30 and the control key 50. As shown in the drawing, the monitor section 30 displays an index picture consisting of 8 frames and messages for inputting information by a so-called written in dialogue method. Incidentally, the control key 50 includes ten-key 50A, cursor shift key 50B and a function key 50C.

When amending or adding the order information for print, the frame to be printed or amended is designated through the index picture. In this operation, the necessary frame is designated such that the frame number displayed with the index picture is inputted by means of the ten-key 50A or the cursor shift key 50B. The number of prints is also designated through the ten-key 50A. When the END key is pressed, the order information is written in the memory 60.

Repeating the above operations, the necessary amendments and addition of order information for an entire film will be completed. Incidentally, pressing "PRIOR INDEX" or "NEXT INDEX" key, the index picture on the monitor section 30 can be changed in such a way that any frame can be confirmed.

Next, the input regarding to trimming information will be explained hereunder.

First, the frame of which trimming information is input should be selected from the index picture. This selection can be done by choosing the frame and pressing the "PLAY" key, whereby the full-sized display corresponding to the selected frame from the index picture will be presented.

The necessary trimming is carried out by zooming on the displayed picture with "MAGNIFY" and/or "REDUCE" key and by moving the display within one frame by operating cursor shift key. When pressing "END" key, the trimming information including zooming information by "MAGNIFY", "REDUCE" and cursor shift key and zooming central position information will be stored in the memory 60.

Lastly, pressing "ORDER" key, the order information in the memory 60 stored operating procedures will be recorded on the magnetic record layer corresponding to the respective frames.

Otherwise, the order information can be recorded with the frame number at a leader portion or end portion of the film 84, or in a record medium in the apparatus or in an external record medium.

As has been mentioned above, in accordance with the present order apparatus for print, when setting the already developed film, the index picture of the film is displayed on the picture display by which the client can order printing, so that it is not necessary to prepare an index print printed thereon index. Accordingly, the client can order printing simply with the already developed film at a DPE shop having the present apparatus, by which an operator designates the necessary frames to be printed after setting the film in the apparatus under the written in dialogue method, so that the total print order can be completed simply.

Furthermore, in accordance with the present invention, the order information for print written in the above-explained order card is read out in the card reader section, which may lead into a simple inputting system of order information without any fault. Since the picture display shows the input order information along with the film picture, the order information can be amended and confirmed preferably while watching the picture display, and therefore if there will be miss-designations on the order card, they will be able to be amended easily.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An order apparatus for printing and re-printing user film orders and allowing the confirmation, amendment or deletion of the user film orders, comprising:

picture display means;

film picture reproducing means for displaying plural frames as an index picture, when setting a developed film housed in a film cartridge in a certain position, on said picture display means after scanning pictures from the developed film, said film cartridge having a single spool, wherein said film picture reproducing means displays all frames in the developed film by changing or scrolling the index picture when the number of frames in the developed film is more than the number of frames in the index picture;

frame designation means for allowing users to designate frames to be printed on the index picture displayed by said picture display means;

order information input means for allowing users to input print order information by manual operation, said print order information including the number of prints corresponding to the frame designated by said frame designation means;

the developed film having magnetic record layers for each frame;

record means for recording on the magnetic record layers, for each frame provided on the developed film, order information for frames to be printed in accordance with said frame designation means and said print order information input means, wherein said record means records print order information in the magnetic record layers for each frame; and confirmation means for allowing users to confirm, amend or delete user print order information before printing frames.

2. An order apparatus for printing and re-printing according to claim 1, wherein said film picture reproducing means includes film feeding means for continuously and constantly feeding the film, a line sensor consisting of photoelectric conversion elements arranged perpendicularly to a feeding direction of the film, a picture memory, and means of storing rough picture data of all frames in the film in said picture memory while the continuous advance movement of the film by means of said film feeding means and for outputting into said picture display means after generating picture signal showing index picture consisting of plural frames from said picture memory.

3. An order apparatus for printing and re-printing according to claim 1, wherein said picture display means displays the print order information.

4. An order apparatus for printing and re-printing according to claim 1, wherein said frame designation means is a selected one from a touch pen designating a point on the screen of said picture display means, a touch sensor provided on the screen of said picture display means, a cursor shift means for shifting a cursor shown on the screen of said picture display means and frame number input means for inputting the frame number.

5. An order apparatus for printing and re-printing according to claim 1, wherein said order information input means designated by said frame designation means.

6. An order apparatus for printing and re-printing according to claim 1, wherein order information input means inputs trimming information consisting of zooming information and zooming central position information, and, when it inputs the trimming information, it displays only the frame designated by said frame designation means on said picture display means and trims the displayed picture based on the trimming information.

7. An order apparatus for printing and re-printing according to claim 1, wherein the print order information is superimposed on each of the frames displayed by said film reproducing means.

8. An order apparatus for print, comprising:

picture display means;

film picture reproducing means for displaying plural frame pictures, when setting a developed film housed in a film cartridge in a certain position, on said picture display means after reading out pictures of the film, the film cartridge having a single spool;

frame designation means for designating a frame to be printed on the picture displayed by said picture display means;

order information input means for inputting order information for print by manual operation, said order information for print including the number of prints corresponding to the frame designated y said frame designation means;

record means for recording on a modifiable record medium provided on the developed film, the order information for a frame to be printed in accordance with said frame designation means and said order information input means, the film having a magnetic record layer for each frame and said record means recording print order information in the magnetic record layer; and a printer which prints details of an order based on the order information recorded in the record medium.

9. An order apparatus for printing and re-printing user film orders and allowing the confirmation, amendment or deletion of the user film orders, comprising:

a picture display;

a film picture reproducer for displaying plural frames as an index picture, when setting a developed film housed in a film cartridge in a certain position, on said picture display after reading out pictures of the film, the film cartridge having a single spool, wherein said film picture reproducer displays all frames in the film by changing or scrolling the index picture when the number of frames in the film is more than the number of frames in the index picture;

a frame designator for designating a frame to be printed on the picture displayed by said picture display;

order information input means for inputting order print information by manual operation, said print order information including the number of prints corresponding to the frame designated by said frame designation means;

confirmation means for confirming the order information;

record means for recording in a record medium the print order information for a frame to be printed in accordance with said frame designation means, said order information input means and said confirmation means; and the film having a magnetic record layer for each frame, wherein said record means records print order information in the magnetic record layer.

10. An order apparatus for printing and re-printing according to claim 9, wherein the print order information is superimposed on each of the frames displayed by said film reproducer.

11. An order apparatus for printing and re-printing according to claim 9, wherein said picture display displays the print order information.

12. An order apparatus for print, comprising:

a picture display;

a film picture reproducer for displaying plural frame pictures, when setting a developed film housed in a film cartridge in a certain position, on said picture display after scanning pictures from the developed film, the film cartridge having a single spool;

a frame designator for designating a frame to be printed on the picture displayed by said picture display;

order information input acceptor for accepting order information for print by manual operation, said order information for print including the number of prints corresponding to the frame designated by said frame designation means;

print order information verifier for confirming the order information;

recorder for recording in a record medium the order information for a frame to be printed in accordance with said frame designator, said order information input acceptor and said print order information verifier, the developed film having a magnetic record layer for each frame, said recorder recording print order information in the magnetic record layer; and a printer which prints details of print orders based on the print order information recorded in the record medium.

13. An order apparatus for print, comprising:

card reader means for optically reading order information for print including the number of prints written on a handwritten order card, including a computer-scored answer sheet, on which the number of prints corresponding to frame numbers is indicated thereon by a user before the order card is inserted into the card reader means, the handwritten order card having a detachable stub which may be used as a print order receipt;

memory means for storing therein order information read by said card reader means;

picture display means;

film picture reproducing means which reads one or more pictures of a developed film housed in a film cartridge corresponding to said order card, displays on said picture display means a single or plural pictures and the order information corresponding to each frame stored in said memory means, and superimposes a frame number corresponding to each frame stored in the memory means on each one of said singular or plural pictures;

frame designation means for designating a frame to be amended or added by watching a displayed picture on said picture display means;

order information input means for inputting order information of the frame designated by said frame designation means by manual operation and for rewriting the order information stored in said memory means based on the input order information; and record means for recording the order information stored in said memory means in a record medium;

the film cartridge having a single spool, wherein said film picture reproducing means includes film feeding means for continuously and constantly feeding the film, a line sensor including photographic conversion elements arranged perpendicularly to a feeding direction of the film, a picture memory, and means for storing rough picture data for all frames in the film in said picture memory during the continuous advance movement of the film by said film feeding means, generating a picture signal showing an index picture including plural frames from said picture memory and outputting the picture signal into said picture display means to display the index picture, said film picture reproducing means displaying all frames in the film by changing or scrolling the index picture when the number of frames in the film is more than the number of frames in the index picture.

14. An order apparatus for print according to claim 13, wherein said frame designation means is selected from a touch pen designating a point on the screen of said picture display means, a touch sensor provided on the screen of said picture display means, a cursor shift means for shifting a cursor shown on the screen of said picture display means and frame number input means for inputting the frame number.

15. An order apparatus for print according to claim 13, wherein said order information input means is provided to input printing type of the frame designated by said frame designation means.

16. An order apparatus for print according to claim 13, wherein order information input means inputs trimming information consisting of zooming information and zooming central position information, and, when it inputs the trimming information, it displays only the frame designated by said frame designation means on said picture display means and trims the displayed picture based on the trimming information.

17. An order apparatus for print according to claim 13, wherein the film includes a magnetic record layer thereon corresponding to respective frames, and wherein said record means is provided to record order information for print on the magnetic record layer.

18. An order apparatus for print according to claim 13, further comprising confirmation means for confirming the order information, and wherein said record means records the order information which has been confirmed by said confirmation means stored in said record medium.

19. An order apparatus for print according to claim 13, wherein said record means is provided to record identification information of the film cartridge and order information for print of the film cartridge in an internal record medium or external record medium.

20. An order apparatus for print, comprising:

card reader means for optically reading order information for print including the number of prints written on a handwritten order card, including a computer-scored answer sheet, on which the number of prints corresponding to frame numbers is indicated thereon by a user before the order card is inserted into the card reader means;

memory means for storing therein order information read by said card reader means;

picture display means;

film picture reproducing means which reads one or more pictures of a developed film housed in a film cartridge corresponding to said order card, and displays on said picture display means a single or plural pictures and the order information corresponding to each frame stored in said memory means, the film cartridge having a single spool;

frame designation means for designating a frame to be amended or added by watching a displayed picture on said picture display means;

order information input means for inputting order information of the frame designated by said frame designation means by manual operation and for rewriting the order information stored in said memory means based on the input order information; and record means for recording the order information stored in said memory means in a record medium; and a printer which prints a receipt of order based on the order information recorded in the record medium.

* * * * *